J. E. HASKELL.
Dovetailing-Machines.

No. 136,374.  Patented March 4, 1873.

Witnesses:
Richard W. Clements
Robert M. Neilson

Inventor:
Joseph E. Haskell

UNITED STATES PATENT OFFICE.

JOSEPH E. HASKELL, OF BALTIMORE, MARYLAND.

IMPROVEMENT IN DOVETAILING-MACHINES.

Specification forming part of Letters Patent No. 136,374, dated March 4, 1873.

*To all whom it may concern:*

Be it known that I, JOSEPH E. HASKELL, of Baltimore, in the county of Baltimore and State of Maryland, have invented certain Improvements in Dovetailing-Machines, of which the following is a specification:

My invention relates to that class of dovetailing-machines where the two pieces of a box or drawer are placed together and subjected to the action of a single cutter, so that the two pieces acted upon shall go together to make one joint; and the nature of my invention is such that the four sides of a drawer or box can all be dovetailed at a single operation, as heretofore.

Figure 1:
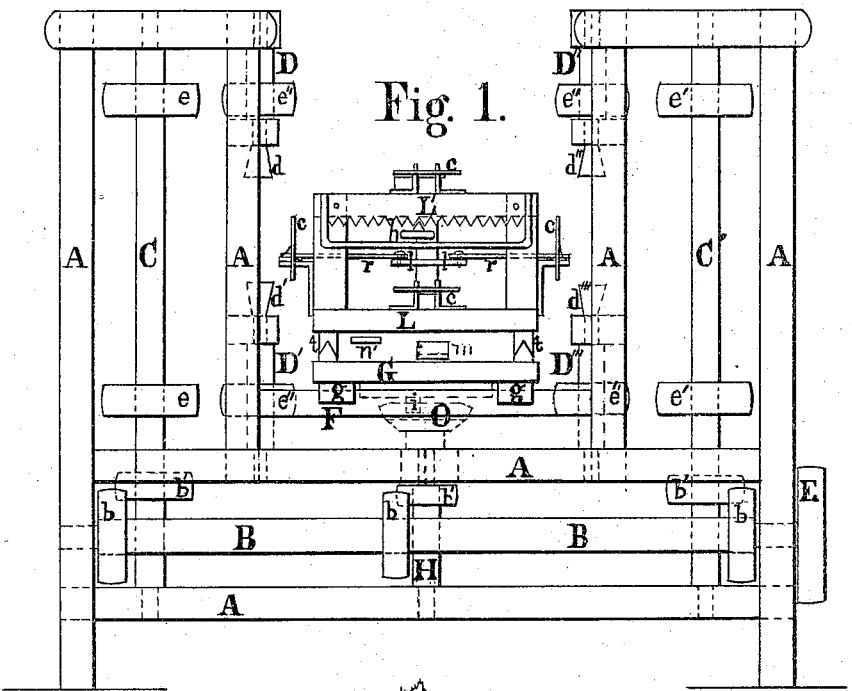
Figure 2:
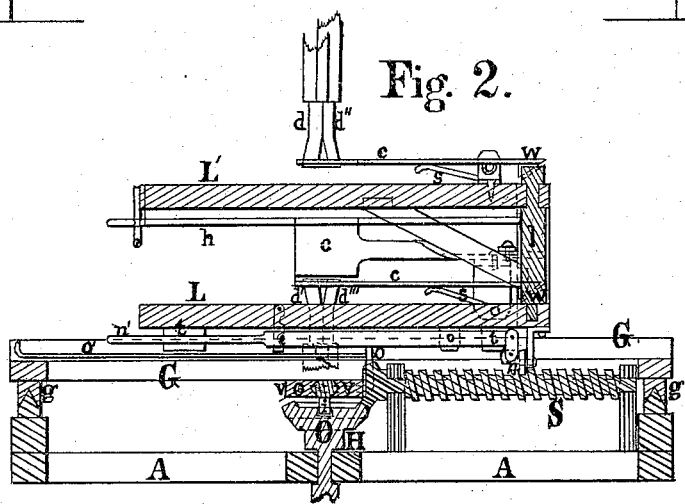
Figure 3:
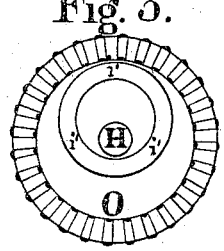
Figure 4:
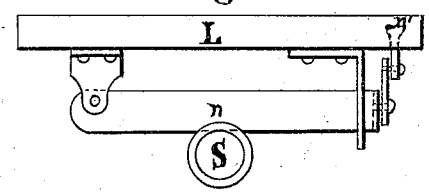

Figure 1 is a front elevation of a machine embodying my invention. Fig. 2 is a longitudinal vertical section through the center of the machine, showing the sliding table L L′ and the parts for operating the table. Fig. 3 is a top view of the gear-wheel O, showing the cam $i'$ for giving the reciprocating motion to the table L L′. Fig. 4 is a rear elevation of the screw S and long nut $n$, which moves the table L L′ along the track or ways G.

A is the main frame of the machine. E is the driving-pulley placed on the shaft B, to which the pulleys $b\ b\ b$ are fastened. Belts from the pulleys $b$ communicate motion to the pulleys $b'\ b'\ b'$ and the shafts on which they are placed, C, C′, and H. The shafts C C′ carry the pulleys $e\ e'$, and the shaft H carries the gear O. Belts from the pulleys $e\ e'$ drive the pulleys $e''$ and the shafts D, D′, D″, and D‴, and the cutter-heads $d$, $d'$, $d''$, and $d'''$. These cutter-heads are provided with one or more knives each. The gear O is provided with a recess (see Fig. 3) placed eccentrically with the center of the gear in which the pin $i$ moves. (See Figs. 1 and 2.) As the gear O revolves the cam or recess $i'$ moves the pin $i$ and the table G (to which the pin $i$ is attached) sidewise on the track F by means of the slides $g\ g$. (See Fig. 1.) The gear O also turns the bevel-gear which is attached to the screw S. (See Fig. 2.) As the screw S turns the nut $n$ passes along its surface, carrying the table L L′, to which it is attached. The table L L′ slides on the tracks G by means of the slides $t\ t$. $c\ c\ c\ c$ are clamps which hold the four sides of the drawer while they are being dovetailed. $h$ is a lever by which the clamps $c\ c\ c\ c$ are pressed down on the sides of the drawer, and is connected with these clamps by the shaft and levers $l\ l$ and the connecting-rods $r\ r$ and wedges W W. $s\ s$ are springs for holding the clamps $c\ c$ back when not required to hold the sides of the drawer. $n'$, Figs. 2 and 4, is a lever to throw the nut $n$ in and out of gear with the screw S. $o'$, Fig. 2, is a lever to operate the catch $o$, by which the pin $i$ is fastened to or relieved from the ways $v\ v$, in which it can slide freely without moving the table G when the catch $o$ is withdrawn.

The operation of this dovetail-machine is as follows: When the machine is started from the main belt on the pulley E, as above described, the cutter-heads $d\ d'\ d''\ d'''$ are made to revolve rapidly, each cutter-head having one or more knives. The cutter-heads $d$ and $d'$ on one side of the machine are placed one-half of the diameter of the cutter-head ahead of the cutter-heads $d''$ and $d'''$ on the other side of the machine, (see Fig. 2,) so that the four sides of the drawer, after being cut and turned, will fit together, giving an even edge all around. To dovetail the four sides of a drawer with this machine, place the front of the drawer across the lower table L, face up, with each end projecting over the edge of the table. Next place the back part of the drawer on the upper table L′, exactly over the front of the drawer which is on the lower table. Next place the two ends of the drawer one on each side of the table and against the ends of the front and back pieces, so that the ends of the side pieces will reach even with the outsides of the front and back—i. e., the four sides are placed together as if forming the four sides of a drawer. When the four sides are placed together in this manner the handle $h$ is carried to the right, which turns the shaft, and the levers $l\ l$ and wedges W W, and closes the clamps $c$ down firmly on all the sides and holds them all in this position. The table L L′ has two separate motions—one lengthwise of the machine, sliding on the ways G G, which motion is given by the screw S, Fig. 2, and another motion sidewise on the tracks F F, which is given to the table by the pin $i$, which works in the eccentric cam $i'$, as shown in Figs. 2 and 3. By these two motions the sides of the drawer are all carried together, first against the cutters on one side, then forward a short distance, then against the cutters on the other side, then forward, then against the cutters on the first side, and so on. Thus on each end a portion of the stock is cut away for a short distance, and then a portion is left as the frame moves on, and is alternately withdrawn from and presented to the cutters. Then by turning the other side out the parts left between the cutters on one piece will go into the recesses cut in the other piece, and a dovetailed drawer or box will be formed.

I am aware that the two boards forming the single corner of a drawer have been placed together and a single cutter such as I use has been passed along the edge, being carried forward a short distance and then made to enter the wood, and so on, forming the same kind of a dovetail joint as I propose to make in this machine; but in that case the parts of the drawer or box were stationary, and the forward and side motions were given to the cutter. This was necessarily a rather slow process, and only one corner of the drawer could be done at once.

What I propose to accomplish in my invention is to cut the four corners of the drawer at a single operation by having four stationary revolving cutters, giving the forward and side motion to the four parts of the drawer together when placed in the form of a rectangle. To hold the parts of the drawer in this position the table is made with an upper and lower platform, as described and as shown in Figs. 1 and 2; and the motion above described is given by the screw S and the cam $i'$ and pin $i$, as above described. The motions of this table on the lengthwise and crosswise tracks are given by the nut $n$ and screw S and by the pin $i$ and cam $i'$. Whenever it is desired to stop the motion along the ways G the long nut $n$ can be raised out of the screw S by means of the lever $n'$. Whenever it is desired to stop the sidewise motion the pin $i$ can be unfastened from the frame L by withdrawing the catch $o$, by means of the handle $o'$.

The pin $i$ is placed on a slide which plays loosely in ways $v$ $v$ on the under side of the table G, unless held in place by the catch $o$.

When both motions are thrown off the table can be readily drawn back to the operator, and when the drawer is removed and a new one placed on the frame the table can be started by throwing the long nut $n$ into the screw S and by fastening the pin $i$ to the table by the catch $o$. The long nut $n$ is necessary, as the table L moves sidewise over the screw S, and is constantly working sidewise over the screw, as well as lengthwise of the screw.

The cutters in a large machine will be so arranged that they can be set at any distance apart, both in length and height, to accommodate all sizes of drawers.

I do not claim the form of the dovetail formed by my dovetail-machine, as I am aware that the same kind of a dovetail is made by a different process; but

I claim as my invention—

1. The combination of the upper and lower platforms L and L' with the clamps $c$ $c$ $c$ $c$ to hold the four sides of a drawer in a rectangular position while being dovetailed, substantially as described.

2. The combination of the long nut $n$, screw S, pin $i$, and cam $i'$, and their operative mechanism with the tables L L', or their equivalents, to give the forward and side motion thereto, substantially as described, and for the purpose specified.

JOSEPH E. HASKELL.

Witnesses:
RICHARD W. CLEMENTS,
ROBERT M. NEILSON.